United States Patent [19]

Sheehy et al.

[11] Patent Number: 4,680,186

[45] Date of Patent: * Jul. 14, 1987

[54] PORTION CONTROLLED SLICED FRESH WHOLE MUSCLE MEAT PRODUCT

[75] Inventors: Roger C. Sheehy, Providence, R.I.; Irwin Muskat, Manchester, N.H.

[73] Assignee: Granite State Packing Company, Inc., Manchester, N.H.

[*] Notice: The portion of the term of this patent subsequent to Mar. 4, 2003 has been disclaimed.

[21] Appl. No.: 810,078

[22] Filed: Dec. 17, 1985

Related U.S. Application Data

[63] Continuation-in-part of Ser. No. 670,362, Nov. 9, 1984, Pat. No. 4,574,087.

[51] Int. Cl.⁴ .................................................. A23L 1/31
[52] U.S. Cl. .................................. 426/129; 426/645; 426/647; 426/414; 426/513; 426/518; 426/392
[58] Field of Search ............... 426/392, 393, 129, 513, 426/518, 414, 645, 647, 413, 404

[56] References Cited

U.S. PATENT DOCUMENTS

| | | | |
|---|---|---|---|
| 2,140,162 | 12/1938 | McKee | 426/518 |
| 2,733,153 | 1/1956 | Hammerberg | 426/513 |
| 2,779,681 | 1/1957 | Sell et al. | 426/513 |
| 3,047,404 | 7/1962 | Vaughan | 426/129 |
| 3,067,041 | 12/1962 | Monteleone | 426/407 |
| 3,370,960 | 2/1968 | Jaccard | 426/513 |
| 3,753,741 | 8/1973 | Stewart | 426/414 |
| 4,072,763 | 2/1978 | Mart | 426/518 |
| 4,363,822 | 12/1982 | Klepiz | 426/393 |

OTHER PUBLICATIONS

Meat Processing Feb. 1982, pp. 42-43, 45 and 48.
Slice N Tact Technical Manual Beltcher Industries 1982.

*Primary Examiner*—R. B. Penland
*Attorney, Agent, or Firm*—Lee A. Strimbeck

[57] ABSTRACT

A portion controlled sliced boneless whole muscle fresh meat product all of the slices of which have substantially the same weight and thickness and the packaged product having the natural configuration for that cut is produced by grouping trimmed pieces of the cut according to weight ranges and passing the pieces of one weight range under considerable confining pressure through a single pass multi-blade slicer the blade spacing of which is pre-set to produce slices having a target weight, and immediately packaging the cut so sliced.

8 Claims, 1 Drawing Figure

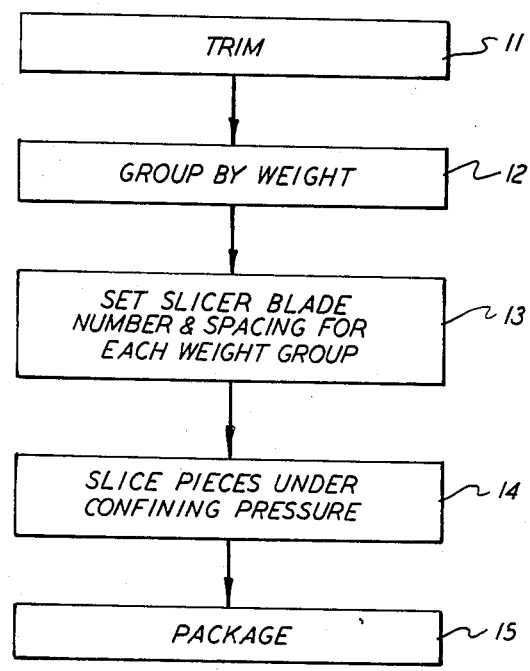

PORTION CONTROLLED SLICED FRESH WHOLE MUSCLE MEAT PRODUCT

RELATED APPLICATION

This application is a continuation-in-part of Portion Pre-Sliced Roast Beef Product and Process, Ser. No. 670,362, filed Nov. 9, 1984, by the present inventors, now U.S. Pat. No. 4,574,087, issued Mar. 4, 1986.

This invention is a concerned with a process of producing a series of portion controlled packaged sliced boneless fresh whole muscle meat product, especially of red-blooded meats, the slices of which are substantially the same weight and size, and with the product produced thereby.

PRIOR ART

The most relevant prior art known to the applicants is extensively set out in said U.S. Pat. No. 4,574,087.

DISCUSSION

Recent efforts in the meat industry have been to provide to institutional accounts pre-sliced meat products that are portion controlled so that there is little waste experienced by the institution, there is good accountability, and a minimum of handling or processing is required in the serving of the product. It is usually desired that each slice of the package be of the same weight and size. For whole muscle fresh meats, this presents a formidable problem inasmuch as the muscle normally cannot be formed into logs or shapes of a uniform cross-section end to end as is done with chopped and shredded reconstituted meats to obtain a uniform slicing. It may be possible to secure a uniform shape with some fresh meats by crust freezing and pressing. This may cause muscle damage, however. Most meat pieces consisting of a single muscle are of a nonuniform contour so that if sliced along a single axis they yield slices of varying weights and sizes.

THIS INVENTION

In brief compass, this invention is a process of producing a series of portion controlled packaged fresh boneless sliced whole muscle red-blooded meat product, the slices of which are substantially the same weight and size and the product as packaged having the natural configuration for that cut of meat. This process comprises the steps of:

1. Trimming a series of fresh boneless red-blooded whole muscle meat pieces of a single cut, such as beef loin strip, but of varying weights, squaring each piece as much as possible.
2. Sorting and grouping the pieces so trimmed to into at least three weight ranges, each of which has preferably 10 pieces with the pieces in each weight range having a length equal to the median length of the group ±7% along the longitudinal axis of the muscle. For beef loin strips having the preferred weight, in the range of 8 to 20 pounds, the weights of the pieces in a single group will be within ±½ pound of the median weight of the group.
3. Setting the blade spacing and number of blades of a single pass multi-blade slicer to suit said median length for one of the weight range groups of said pieces as the same are confined under pressure as specified in step 4, and produce slices therefrom of a pre-determined weight for each slice, including the two end slices.
4. Passing the pieces of the one weight range group one at a time across the grain through said multi-blade slicer while confining the pieces under pressure to reduce the unrestrained length of each piece by at least 7%, but without distortion or buckling of the muscle, the confining pressure being effected by having each piece forcibly pushed under the action of a ram through two confining end walls and under a confining top surface pressing the piece against the bottom surface on which the piece rests to give a rectangular confining passageway.
5. Similarly setting the blade spacing and/or number of blades of a single pass multi-blade slicer to suit the median lengths for each of the other of the weight range groups of pieces and produce slices therefrom of said pre-determined weight for each slice and slicing each said weight range group as in step 4, and
6. Vacuum packing said pieces so sliced for shipment.

The slices of the series of packaged product produced by this process will have a weight within ±1 ounce of the median weight of the slices, and 75% will have a weight within ±½ ounce of the median weight. Until now, it was not thought to be possible to use such equipment to slice uncooked cuts of nonuniform contours and secure such close control of slice weights, especially as fresh meats move or handle differently and with more difficulty than those that are cooked.

This invention has particular applicability to the processing of beef loin strip, beef rib, veal top round, and pork loin.

As is known by the art, if a freshly cut surface of a red-blooded meat is exposed to air, it will bloom to a red color which will then be followed by darkening and deterioration. In the pre-slicing of fresh meats for customers, this blooming has presented a problem inasmuch as it has been difficult to carry out the slicing without exposing the slices to air. When this happens, blooming and deterioration occur before the customer is ready to use the product. For this reason pre-slicing of fresh meats has not been favored unless they have been frozen solid and are sawed as with a band saw or sliced on a cleaver type slicer while in a frozen or tempered state and kept frozen thereafter. However, such freezing and thawing in itself is deliterious to the meats.

DRAWING

The drawing illustrates the steps of this process in which the steps are:

11. Trim
12. Group by weight
13. Set slicer blade number and spacing for each weight group
14. Slice pieces under confining pressure
15. Package

EXAMPLE

In this example, 200 pieces of boneless whole muscle beef loin strip are processed in accordance with the teachings of this invention. The median weight of the pieces is 13 pounds, with the pieces varying in weight from 12 pounds to 14 pounds.

Upon receipt, the pieces are trimmed. This trimming removes excess fat and gristle and inasmuch as possible squares the pieces, i.e. shapes them into rectangular shapes in cross-section.

The pieces so trimmed are then weighed and sorted by weight into groups differing incrementally about ½ pound one from another. All pieces in each group have the same length ±7%.

A single multi-blade slicer is used, such as a Slice-N-Tact, as described in the aforementioned patent. The target slice weight is 8 ounces. To produce this, the blade spacing in the Slice-N-Tact harp is set at 0.68 inches. The two end blades are spaced the same distance from the two confining end walls. The slicer has a top plate or comb such as is shown in U.S. Pat. No. 3,753,741, Stewart, which in this example is spaced a distance of 2¾ inches from the bottom surface so as to exert a considerable pressure on the meat. The sizing of the rectangular passageway is such that the meat cannot be forced therethrough by hand. A hydraulic ram with a flat front plate about the size of the opening is used to accomplish this. Each piece is longitudinally compressed by at least 7%. The meat pieces are cut across grain, i.e. perpendicular to the longitudinal axis of the muscle.

The combination of the end walls and the top pressure causes the strip to be constrained with considerable amount of pressure to the shape of the rectangular passageway with the consequence that as the slices are formed there are of substantially uniform size and thus of substantially uniform weight. It is believed that this slicing of the meat while exerting such a considerable pressure has not heretofore been practised in the industry.

As the slices emerge from behind the blades, they immediately close on themselves thus substantially preventing any air from contacting the faces of the slices. The sliced piece is then removed from the slicer while holding the whole piece together and immediately packaged for shipment. Each slice has a weight within 1 ounce of the target weight and 75% have a weight within ½ ounce of the target weight. Usually the packaged beef loin strip will weigh at least 4 pounds. Larger cuts of meat are split after slicing to obtain the desired packaged weight. For example, for steaks, eight 8 ounce slices can be packaged in one package to give a package weight of 4 pounds. The steaks will have their customary shape and texture when cooked as the muscle has retained its integrity.

We claim:

1. A process of producing a series of portion-controlled packaged fresh boneless sliced whole muscle red-blooded meat product the slices of which are of substantially the same weight and size, comprising the following steps:
   (1) trimming a series of fresh, boneless red-blooded whole muscle meat pieces of a single cut but of varying weights, squaring each piece;
   (2) sorting and grouping the pieces so trimmed into at least three weight ranges, the pieces in each weight range having a length equal to the median length thereof, ±7%, along the longitudinal axis of the muscle;
   (3) setting the blade spacing and number of blades of a single pass multi-blade slicer to suit said median length for one of said weight range groups of said pieces, as confined under pressure as specified in step 4, and produce slices therefrom of a pre-determined weight for each slice, including the two end slices;
   (4) passing said pieces of said one weight range group one at a time across the grain through said multi-blade slicer under confining pressure to reduce the unrestrained length of each piece by at least 7% but without distortion or buckling of the muscle, said confining pressure being effected by having each piece forcibly passed under the pressure of a ram through two confining end walls and under a confining top surface pressing the piece against a bottom surface on which the piece rests to give a rectangular confining passageway thereby cutting each piece into slices of said predetermined weight;
   (5) similarly setting the blade spacing and number of blades of a single pass multi-blade slicer to suit said median lengths for each of the other of the said weight range groups of pieces and produce slices therefrom of said pre-determined weight for each slice, and slicing each said weight range group as in step 4; and
   (6) packing said pieces so sliced for shipment;
said pieces and the slices therefrom having not been crust chilled or frozen at any time during processing.

2. The process of claim 1 wherein said single cut is selected from the group consisting of beef loin strip, beef rib, veal top round, and pork loin.

3. The process of claim 1 wherein in step 4 a hydraulic ram is used to push the pieces through said multi-blade slicer.

4. The process of claim 1 wherein all of the slices have a weight within ±1 ounce of said pre-determined weight and 75% thereof have a weight within ±½ ounce of said pre-determined weight.

5. A process of producing a series of packaged fresh boneless sliced whole muscle meat product the slices of which are of substantially the same weight and size, comprising the steps of:
   (1) trimming and preparing a group of at least 10 pieces of fresh boneless whole muscle meat pieces of a single cut each of which has a length within ±7% of the median length of said group, squaring each piece at least to some extent;
   (2) setting the blade spacing and number of blades of a single pass multi-blade slicer to suit said median length and produce slices therefrom of a pre-determined weight for each slice, ±1 ounce, including the two end slices;
   (3) passing said pieces one at a time across the grain through said multi-blade slicer under confining pressure to reduce the unrestrained length of each piece by at least 7% without distortion or buckling of the muscle, said confining pressure being effected by having each piece forcibly passed through two confining end walls and under a confining top surface pressing the piece against a bottom surface on which the piece rest to give retangular confining passageway thereby cutting each piece into slices of said predetermined weight; and
   (4) packing said pieces so sliced for shipment;
said pieces and the slices therefrom having not been crust chilled or frozen at any time during processing.

6. The process of claim 5 wherein said pieces are of a red-blooded meat and said slicing and all steps subsequent thereto being done in a manner to virtually exclude air from contacting the faces of facing slices.

7. The process of claim 6 wherein said meat pieces are beef loin strip and each of said pieces has a weight in the range of 8 to 14 pounds and wherein at least 75% of said slices have a weight within ±½ ounce of said pre-determined weight.

8. A portion controlled boneless sliced whole muscle red-blooded fresh meat product produced by the process of claim 5 comprising, one of a series of a single cut of meat, the slices of which are of a pre-determined weight ±1 ounce for all the slices of said series, the faces of facing slices being virtually free from exposure to air and said product having the natural configuration of said cut.

* * * * *